United States Patent
Sachdeva et al.

(10) Patent No.: US 10,906,670 B2
(45) Date of Patent: Feb. 2, 2021

(54) METHODS FOR EFFLUENT BASED CONDITION ASSESSMENT

(71) Applicant: GENERAL ELECTRIC COMPANY, Schectady, NY (US)

(72) Inventors: Deepika Sachdeva, Karnataka (IN); Raji Reddy, Dubai (AE); Chithra Parayalil, Karnataka (IN); Anshul Kaushik, Karnataka (IN); Saratchandra Shanmukh, Karnataka (IN); Venkatesh Rajagopalan, Karnataka (IN)

(73) Assignee: GENERAL ELECTRIC COMPANY, Schectady, NY (US)

(*) Notice: Subject to any disclaimer, the term of this patent is extended or adjusted under 35 U.S.C. 154(b) by 53 days.

(21) Appl. No.: 16/306,929

(22) PCT Filed: May 23, 2017

(86) PCT No.: PCT/US2017/033908
§ 371 (c)(1),
(2) Date: Dec. 4, 2018

(87) PCT Pub. No.: WO2018/004873
PCT Pub. Date: Jan. 4, 2018

(65) Prior Publication Data
US 2019/0144136 A1    May 16, 2019

(30) Foreign Application Priority Data
Jun. 29, 2016 (IN) .............................. 201641022383

(51) Int. Cl.
*B64F 5/60* (2017.01)
*F01D 25/00* (2006.01)
*B64F 5/40* (2017.01)
*G01M 15/14* (2006.01)

(52) U.S. Cl.
CPC ................. *B64F 5/60* (2017.01); *B64F 5/40* (2017.01); *F01D 25/002* (2013.01);
(Continued)

(58) Field of Classification Search
CPC .. B64F 5/60; B64F 5/40; F01D 25/002; F01D 2230/72; F01D 2260/80; G01M 15/14
(Continued)

(56) References Cited

U.S. PATENT DOCUMENTS 7,297,260 B2   11/2007   Hjerpe et al.
8,197,609 B2    6/2012   Alvestig et al.
(Continued)

FOREIGN PATENT DOCUMENTS

EP   1914010 A2   4/2008
EP   2180146 A2   4/2010

OTHER PUBLICATIONS

Ezenwa A Ogbonnaya, "Gas Turbine Performance Optimization Using Compressor Online Water Washing Technique", Engineering, vol. 3, Issue: 5, pp. 500-507, May 2011.
(Continued)

*Primary Examiner* — Tan Q Nguyen
(74) *Attorney, Agent, or Firm* — Dority & Manning, P.A.

(57) ABSTRACT

A method for determining a condition of a second component of an engine is disclosed wherein the engine includes at least a first component and the second component. The method includes determining a concentration value of a chemical species in an effluent obtained from washing at least a portion of the first component of the engine, inputting the concentration value of the chemical species in a condition assessment model to update the condition assessment model, and estimating the condition of the second component based on an output of the updated condition assessment model. The effluent used herein includes a wash fluid and the
(Continued)

chemical species. The second component is different from the first component and the condition assessment model is a representative of a condition of the second component of the engine.

19 Claims, 6 Drawing Sheets

(52) U.S. Cl.
CPC ......... G01M 15/14 (2013.01); *F05D 2230/72* (2013.01); *F05D 2260/80* (2013.01); *F05D 2260/81* (2013.01)

(58) Field of Classification Search
USPC .......................................................... 701/100
See application file for complete search history.

(56) References Cited

U.S. PATENT DOCUMENTS

| 8,273,184 | B2 | 9/2012 | Wagner |
| 8,628,627 | B2 | 1/2014 | Sales |
| 2007/0118271 | A1 | 5/2007 | Wiseman |
| 2010/0102835 | A1 | 4/2010 | Chillar et al. |
| 2013/0074879 | A1* | 3/2013 | Battaglioli ............ F04D 29/705 134/34 |
| 2013/0104934 | A1 | 5/2013 | Tadayon |
| 2015/0159122 | A1 | 6/2015 | Tibbetts et al. |
| 2016/0024438 | A1 | 1/2016 | Tibbetts |
| 2016/0045841 | A1* | 2/2016 | Kaplan .................... C10G 1/02 429/49 |

OTHER PUBLICATIONS

Klaus Brun et al., "Experimental Evaluation of the Effectiveness of Online Water-Washing in Gas Turbine Compressors", Journal of Engineering for Gas Turbines and Power, vol. 137, Issue: 4, pp. 15, Apr. 1, 2015.

International Search Report and Written Opinion dated Aug. 22, 2017 which was issued in connection with PCT application PCT/US2017/033908 which was filed on May 23, 2017.

* cited by examiner ions, based on the collected data. Previous field experience with an engine having a similar design may also be used to estimate the condition of an engine component. However, a lack of precision on the estimation of a condition of the engine component at any particular point in the lifespan may increase maintenance cost and reduce availability of the engine, thereby reducing revenue generated by the engine.

METHODS FOR EFFLUENT BASED CONDITION ASSESSMENT

BACKGROUND

The present disclosure relates generally to engines and, more specifically, to methods for effluent based condition assessment of an engine component.

Engines, such as aircraft engines that are used to propel aircraft through certain regions often experience significant corrosion and fouling due to heavy environmental particulate matter intake during flight, idling, take-off, and landing. Accelerated degradation and failure of engine components in these engines may occur in service. Failure of engine components during service can lead to in-flight shutdowns, aborted take offs and unscheduled engine removals leading to productivity losses and possible safety concerns.

Accurate and cost-effective maintenance planning for such engines requires precise predictions of conditions of the engine components. Existing design and maintenance practices focus on collection of operational, damage, and failure data from various sensors and from inspection of the engine as it operates in the field, and comparing the collected data with lifespan predictions made at the design stage. Previous field experience with an engine having a similar design may also be used to estimate the condition of an engine component. However, a lack of precision on the estimation of a condition of the engine component at any particular point in the lifespan may increase maintenance cost and reduce availability of the engine, thereby reducing revenue generated by the engine.

The use of diagnostics, prognostics, or health monitoring in component assessment and maintenance planning relies largely on collected sensor data and fusion algorithms to combine the sensor data. Further, some of the current engine component assessment models use environmental data collected from satellites as well as other meteorological sources. The environmental data used for these models are cumulative in nature and may not be an accurate representation of the contaminants that individual engines are exposed to. Therefore, the current engine component assessment models may not provide a picture of the forces and material response that may drive degradation of the engine component.

BRIEF DESCRIPTION

In accordance with some aspects, a method for determining a condition of a second component of an engine is disclosed wherein the engine includes at least a first component and the second component. The method includes determining a concentration value of a chemical species in an effluent obtained from washing at least a portion of the first component of the engine, inputting the concentration value of the chemical species in a condition assessment model, to update the condition assessment model, and estimating the condition of the second component based on an output of the updated condition assessment model. The effluent used herein includes a wash fluid and the chemical species. The second component is different from the first component and the condition assessment model is a representative of a condition of the second component of the engine.

In accordance with some aspects, a method for determining corrosion of a hot-section component of an aviation engine is disclosed. The method includes determining a concentration value of a chemical species in an effluent obtained from washing at least a part of a compressor of the aviation engine, inputting the concentration value of the chemical species in a corrosion model of the hot-section component of the aviation engine to update the corrosion model, and estimating presence of the corrosion, an amount of the corrosion, or both of the hot-section component of the aviation engine. The effluent used herein includes a wash fluid and the chemical species, and the corrosion model is a representative of corrosion in the hot-section component of the aviation engine.

Other embodiments, aspects, features, and advantages of the invention will become apparent to those of ordinary skill in the art from the following detailed description, the accompanying drawings, and the appended claims.

BRIEF DESCRIPTION OF THE DRAWING FIGURES

These and other features, aspects, and advantages of the present invention will become better understood when the following detailed description is read with reference to the accompanying drawings in which like characters represent like parts throughout the drawings, wherein.

Figure 5:
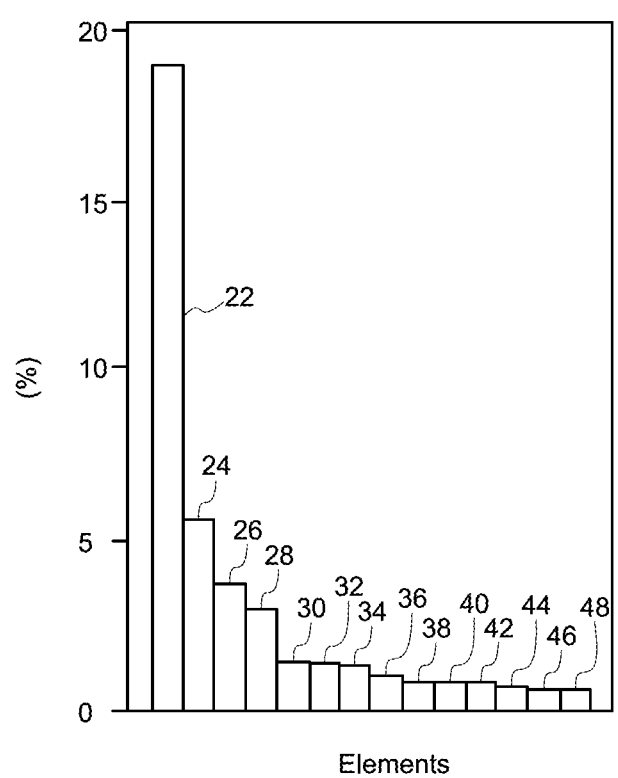
Figure 6:
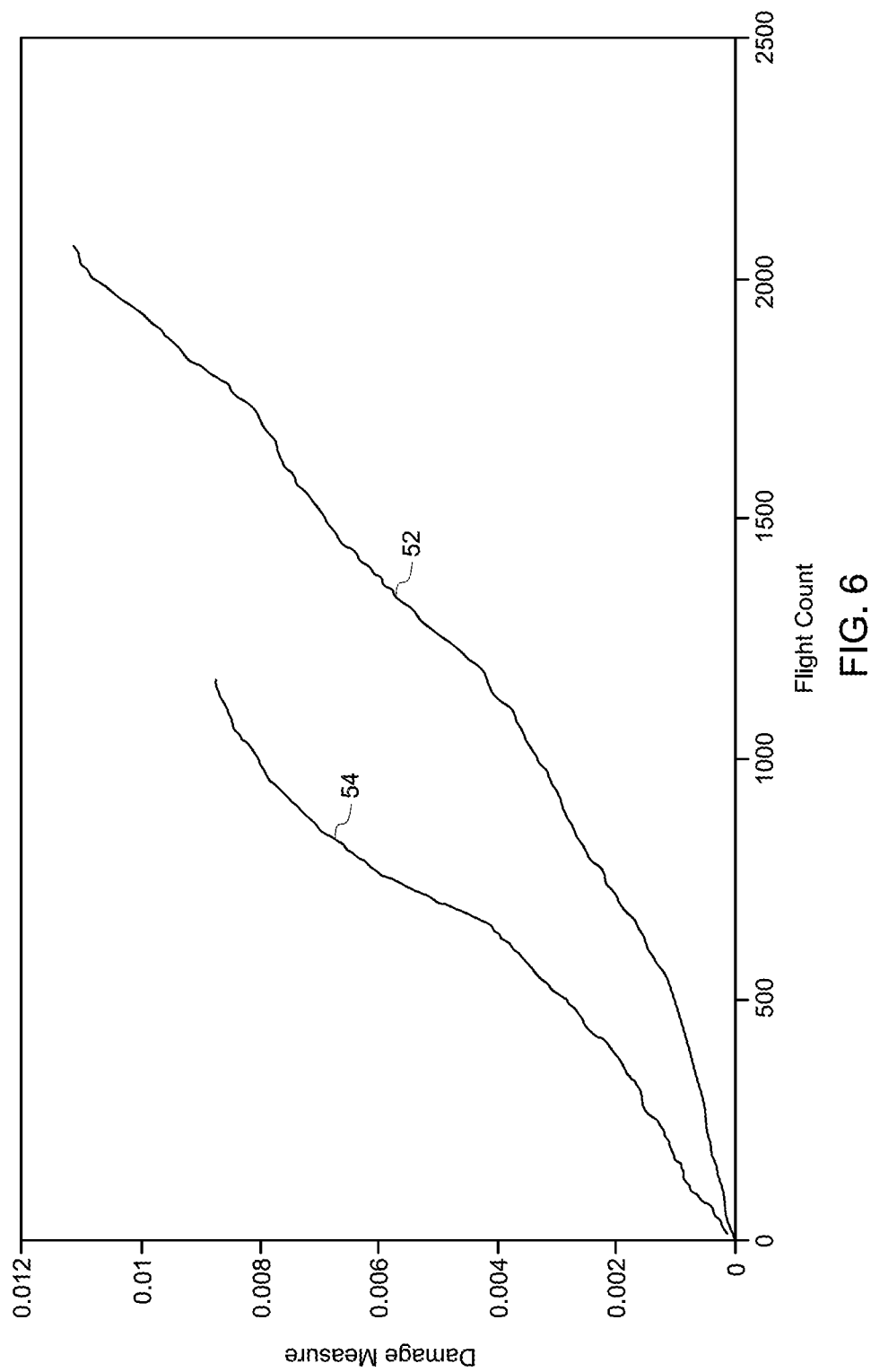

FIG. 5 illustrates data obtained from inductively coupled plasma analysis of representative suspended solids in a water-wash effluent of a compressor of an aviation engine, in accordance with an embodiment of the disclosure; and FIG. 6 is a schematic representation of a comparison of the damages predicted by a hot corrosion model before and after updating the model by inputting concentration data of chemical species obtained from a water-wash effluent of a compressor of an aviation engine, in accordance with an embodiment of the disclosure.

DETAILED DESCRIPTION

As discussed in detail below, embodiments of the present invention include methods suitable for estimating condition of different components of an engine (alternately, "engine components") based on the presence and concentration of certain chemical species in an effluent of the engine. These methods may advantageously result in one or more of decreased shutdowns of engines, increased efficiency of the engines, and simplified estimation process for predicting a condition of one or more engine components.

Approximating language, as used throughout the specification and claims, may be applied to modify any quantitative representation that could permissibly vary without resulting in a change in the basic function to which it is related. Accordingly, a value modified by a term or terms, such as "about", is not limited to the precise value specified. In some instances, the approximating language may correspond to the precision of an instrument for measuring the value. Further, throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Generally, aviation engines are periodically washed with a wash fluid, optionally with addition of detergents, to remove contaminants that may have been accumulated during flight and to reduce the amount of corrosives present on the engine components. This process of washing helps in restoring the engine efficiency and in restoring an exhaust gas temperature of the engine. The process of washing the engine components may be carried out offline (i.e. when the engine is not in operation or when the engine is not active) or online (i.e. during operation of the engine).

Different wash processes may be used to remove the chemical species from a component of the engine, which will be referred to herein as "the first component" to differentiate over other components of the engine that may also be involved in the techniques disclosed herein. In some embodiments, washing may be performed by injecting the wash fluid from a point upstream of the first component of the engine and forcing the wash fluid through the first component of the engine, thereby washing off and at least partly removing residual buildup of chemical species from the first component of the engine.

As a result of forcing the wash fluid through at least a portion of the first component, an effluent having a mixture of the wash fluid and the chemical species that are washed off from the first engine component is obtained. In some embodiments, the chemical species may include contaminants, debris, corrosive elements, or combinations thereof, that are removed from the portion during the wash of the first component. In some embodiments, the chemical species that are present in the effluent may include a decomposed or dissolved form of one or more of the contaminants, debris, and corrosive elements that are removed from the first component. For example, if the wash fluid removes a sulfate from first component of the engine, the chemical species that is present in the effluent may be in the form of sulfate or may be in the form of a decomposed product of the sulfate including, for example, sulfate ions.

In some embodiments, the chemical species present in the effluent may include an organic species, an inorganic species, an ionic species, or combinations thereof. In some example embodiments, the chemical species present in the effluent may include sulfur, chlorine, calcium, sodium, potassium, aluminum, magnesium, cobalt, nickel, iron, phosphorous, chromium, manganese, or combinations thereof. Non-limiting examples of other elements that may be present in the effluent may include silicon, iron, aluminum, nickel, potassium, cobalt, calcium, zinc, sodium, titanium, chromium, magnesium, copper, sulfur, or combinations thereof.

Type of contaminants, debris, or corrosive elements that are removed from the portion of the first component may be representative of the extent and nature of degradation of the engine hardware, in general. For example, surfaces in the internal passages of the engine may accumulate mineral dust due to prolonged operation of the turbine engine. As used herein, "mineral dust" generally refers to naturally occurring granular material including particles of various rocks and minerals that may accumulate in the turbine engine during taxi, take-off, climb, cruise, or landing of an aircraft employing the turbine engine. The mineral dust accumulation may also occur when the turbine engine is not in operation. It may be noted that elemental composition and phase of the accumulated mineral dust varies based on a location of the mineral dust within sections of the engine, and/or the operational environment of the engine. For example, increased temperatures in the high-pressure turbine section caused by combustion typically result in enhanced temperatures on surfaces of the components therein; mineral dust on surfaces with enhanced temperatures may thermally react to form CMAS (calcium-magnesium-aluminum-silicon-oxide) based reaction products.

The process of washing the engine components results in an effluent that drains out of the engine components. The effluent may include a wash fluid and one or more chemical species. The wash fluid may be a suitable liquid or gas that is capable of removing contaminants from the engine components. In some embodiments, the wash fluid may include water, other organic or inorganic solutions, or any combinations thereof. Further, the wash fluid may include acidic, basic or neutral solutions. The wash fluid may further include various chemical agents, detergents, or both, to increase the efficiency of washing. In some embodiments, the wash fluid may be selected such that the wash fluid selectively dissolves the constituents of a material that are foreign to the components of the engine. As used herein, "selectively dissolves" refers to an ability of the wash fluid to be reactive with predetermined materials, and to be substantially unreactive with the materials of the components of the engine. In some embodiments, the wash fluids described herein facilitate removing reacted and unreacted foreign material from the turbine engine while being substantially unreactive with the materials used to form the turbine components, to limit damage to the underlying components. In some embodiments, the wash fluid that is used for washing may slightly vary from the wash fluid that is present in the effluent, depending on the wash process and the dissolved constituents.

During one wash cycle, the washing process may be repeated multiple times using multiple rinses to reestablish a desirable level of efficiency of the engine. Same or different wash fluids may be used in different washing processes in one wash cycle. In one example, a first wash fluid suitable for removing a first contaminant from the first component of the engine may be used in a first washing process. Subsequently, a second wash fluid suitable for removing a second contaminant from the first component of the engine may be used in a second washing process, where the first washing process is followed by the second washing process in a particular wash cycle. Advantageously, using different wash fluids targeted to remove different contaminants may enhance removal of contaminants from the first component. In a wash cycle, the washing process may be terminated after certain pre-determined number of washing processes or after an amount of one or more chemical species in the effluent is detected below a certain specified limit. A portion of a sample of the effluent may be used to determine the composition and concentration of the chemical species present in the first component. In some embodiments, a set of wash fluids may be used in a determined sequence. In some of these embodiments, the washing process may be kept consistent in different wash cycles by for example, using the set of wash fluids in the same determined sequence. In some embodiments, a consistent process for collecting the effluent and analyzing the same may be established. For example, the effluents may be collected at the same portion of the washed first component at the same time interval in all the washing processes of all the wash cycles.

In some embodiments, water is used as a wash fluid. In some embodiments, water may be used along with detergents, chemical agents, or both. The process of washing the engine components with a wash fluid that includes water is henceforth referred to as water-wash process. In certain embodiments, water-wash process is employed for washing the first component of the engine.

As will be appreciated, the chemical species that are part of the effluents of different engines may not have a defined composition. Further, any number of factors may influence the quantity and type of chemical species present in the effluent. For example, types of chemical species and quantity of chemical species may vary from location to location of operation of the engine, as one location of operation may have a higher concentration of a certain chemical species, whereas a different location of operation may have a lower concentration of that chemical species or may not have any trace of that particular chemical species. Furthermore, contamination of a component of the engine and thereby the chemical species in the effluent may vary due to one or more factors such as, but not limited to, local vegetation, industrial process, and prevailing weather. Other ambient factors may also vary. The ambient factors may include, but are not limited to, weather temperature, weather humidity, weather pressure, season, and geographical location.

Some of the currently practiced models for predicting a life span, or an efficiency decrease of the components of the engine, use operational and environmental data. These models may match an observed average of the actual condition observed in field operation but may not match the variation that might have occurred due to the variations in some particular parameters that may be different from the normally used average parameters. These mismatches may be due to insufficient physics simulations, or models not accounting for individual engine variability. Therefore, an accurate data of particular parameters that are individualized for the particular region, or particular engine would provide a more precise estimation of a condition of a component of the engine.

Through combining an existing or improved design model in conjunction with large sets of properly measured field sensor, operational, or composition data, good matches may be achieved between actual and estimated condition of an engine component. In some embodiments, a composition of a component-specific effluent may be used for developing more accurate lifing models and estimating a condition of a component of the engine. For example, a condition assessment model may provide an accurate condition assessment and maintenance planning for engines through maximum utilization of design physics models, field sensor data, inspection data, and the data about chemical species that accumulate over the engine components.

Thus, the confidence of the currently practiced models may be improved by incorporating the concentration values of chemical species in the effluent, resulting in reduction in time away from service and improvement in productivity and contractual service agreements.

Figure 1:
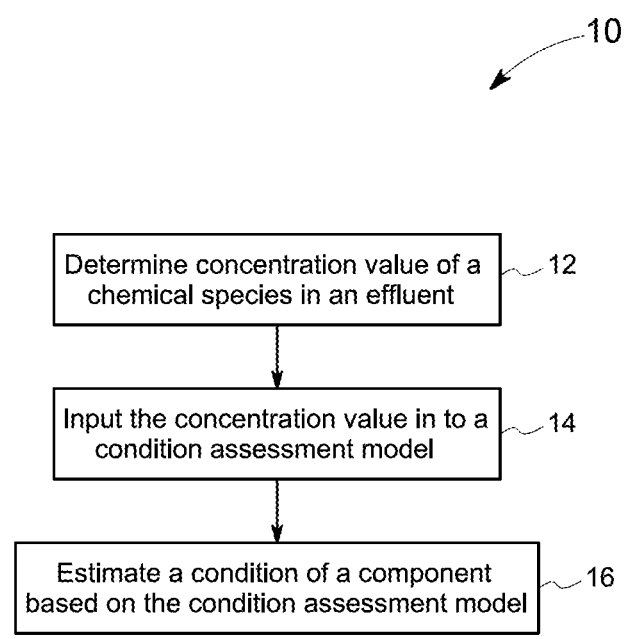
FIG. 1 illustrates steps of a method for determining a condition of a component of an engine, in accordance with an embodiment of the disclosure.

In some embodiments, a method 10 for determining a condition of an engine component is disclosed, as illustrated in FIG. 1. The method 10 includes a step 12 of determining a concentration value of a chemical species in an effluent, wherein the effluent may be obtained from washing at least a portion of a first component of an engine. The effluent may include a wash fluid and the chemical species. In some embodiments, the method 10 includes inputting the concentration value of the chemical species in a condition assessment model at step 14, to update the condition assessment model of a second component of the engine. The first component and the second components may be same or different from each other. In some embodiments, the method 10 further includes estimating a condition of the second component based on an output of the updated condition assessment model as illustrated in step 16.

In certain embodiments, the effluent is obtained by washing at least a portion of a first component of the engine. The first component of the engine may include an engine compressor, a compressor blade, a compressor casing, a combustor, a turbine blade, a turbine shroud, a turbine blade underplatform, a turbine disk, a turbine casing, or combinations thereof. In some embodiments, only a portion of the first component of the engine may be washed. In some other embodiments, the whole component may be washed and the effluent may be collected.

It may be noted that mere detection of presence or absence of chemical species may not be sufficient to determine condition of an engine component. Accordingly, in some embodiments, a concentration value of a chemical species in the effluent is used for determining condition of a component of the engine. The concentration value of the chemical species is used to deduce details regarding desirable or undesirable modifications in the engine component that may have taken place over a period of time, for example during operation of the engine. In some embodiments, the method 10 of determining a concentration value of a chemical species in an effluent may include determining the concentration value of the chemical species dissolved in the wash fluid, suspended in the wash fluid, or settled in the wash fluid, or any combinations thereof.

As used herein, the term "concentration value of a chemical species in an effluent" refers to the amount of the chemical species in the effluent. The chemical species may be in the atomic form, ionic form, molecular form, or any combination thereof depending on the chemical species at the time of washing, at the time of analysis, or combination thereof.

In some embodiments, during an analysis of the effluent, one or more species of interest may be identified and concentration of these species of interest in the effluent may be determined. By way of example, species of interest may include chemical species that are likely to cause comparatively greater amount of material degradation in the engine as compared to some other species present in the engine.

In some embodiments, variation in the composition of the chemical species in the effluent may be utilized to estimate a condition of a component of the engine. In some embodiments a variation in the concentration of the chemical species may be used to infer environmental conditions that an engine component may have encountered, and further may be used to estimate the current and future condition of the engine component.

In some embodiments, the washing process may be carried out on a first component of the engine, and the estimation of condition may be made for a second component of the engine. The first component and the second component may be same or different from each other. For example, in some embodiments, at least a portion of the first component of the engine is washed and the effluent is analyzed to determine a condition of the first component of the engine itself. Alternatively, in some other embodiments, at least a portion of the first component of the engine is washed and the determination of a condition of the second component of the engine is carried out, where the second component is different from the first component of the same engine. In some embodiments, the determined concentration value of the chemical species is specific for that individual engine and is used as input to the condition assessment model to improve the prediction accuracy of the condition of any component of the same individual engine. Advantageously, washing the first component of the engine and analyzing the effluent to assess the condition of the second component of the engine is useful in situations where it may be difficult or time consuming to wash the second component and obtain concentration of the chemical species in the effluent of the second component.

The concentration of the chemical species found in the effluent of the first component of the engine may provide a signature of the operational and weather conditions that the engine has faced and hence may be used for the condition assessment of the second component of the same engine. In some embodiments, a relationship between the concentration values of the chemical species in the effluent of the first component and the concentration values of the chemical species in the second component is developed thereby enabling condition assessment of the second component. In some embodiments, the concentration value of the chemical species in the effluent of the first component may provide an insight into the chemical and physical alterations that may have occurred over time in the second component, without deducing the possible chemical species that may be present in the effluent of the second component. For example, a concentration of a sulfate ion in the effluent of the first component may provide an indication of sulfate corrosion in the first and/or second components. By assessing the sulfate concentration in the first component, and deriving a relationship between the sulfate concentration in the first component and corrosion damage in the second component using certain other additional inputs, sulfate-based corrosion of the second component may be accurately predicted. Non-limiting additional inputs may include temperature differences between the first and second components, relative positions of the first and second components, and exposure of the first and second components to the operating environments, and the corrosion rate constants of materials used in the second component.

The concentration value of the chemical species may be determined by different methods such as, for example, X-ray diffraction, scanning electron microscopy, energy dispersive and wavelength dispersive spectroscopy, inductively coupled plasma mass spectroscopy, atomic emission spectroscopy, mass spectrometry, ion chromatography, or combinations thereof. In certain embodiments, one or more of these methods may be used for qualitative and/or quantitative analysis of the chemical species. For example, mass spectrometry may be used to measure an electron shell spectrum of chemical elements that constitute the effluent and to deduce the concentration value of the chemical species from the effluent composition. As a result, concentration values of one or more isolated samples of the chemical species may be provided.

In some embodiments, the method 10 includes inputting a concentration value of the chemical species from an effluent from a first component of the engine in a condition assessment model for the second component of the engine.

In certain embodiments, the condition assessment model is a correlation based model that is used to assess a condition of an engine or components of the engine at a given time. The condition assessment model of the second component may be a single model or a collection of multiple models that collectively facilitate prediction of a condition of the second component. A condition of a component, without any limitation, may include oxidation, corrosion, deposition of foreign particles, crack dimension, wear, or any combinations thereof. Further, in one embodiment, a condition assessment model may be used to predict the lifespan of an engine component, or a particular condition of the engine component, at a particular time in the life of the engine, depending on the varying parameters such as, for example, operating conditions, operating environment, age, and exposure of the engine component. The condition assessment model may include one or more of a crack propagation model, an oxidation model, a corrosion model, a wear model, or combinations thereof. An accuracy of the condition assessment model may depend on multiple parameters. Further, the accuracy of the condition assessment model may also depend on accuracy of the data used for inputting different parameters of the model.

Accordingly, in certain embodiments, the concentration values of the chemical species measured from the effluents of the washing process are inputted to a condition assessment model of a second component of the engine. In some embodiments, the concentration values of the chemical species may be inputted in the condition assessment model. In some other embodiments, in addition to the concentration values, the sensor data, operational data, environmental data, or combinations thereof may be inputted in the condition assessment model. Inputting the condition assessment model with the concentration values of the chemical species updates the condition assessment model, thereby resulting in an improvement in the accuracy in estimating of the condition, lifespan, or combination thereof of the second component of the engine.

As discussed earlier, the first component of the engine may include an engine compressor, a compressor blade, a compressor casing, a combustor, a turbine blade, a turbine shroud, a turbine blade underplatform, a turbine disk, a turbine casing, or combinations thereof. In some embodiments, the second component of the engine may include an engine compressor, a compressor blade, a compressor casing, a combustor, a turbine blade, a turbine shroud, a turbine blade underplatform, a turbine disk, a turbine casing, a turbine nozzle, or combinations thereof. Further, the first component and the second component may be same or different. Thus, in a non-limiting example, at least a portion of a turbine blade may be washed, and by the analysis of the effluent obtained by washing, a condition of the turbine blade or a set of turbine blades may be assessed by inputting concentration values of one or more chemical species in the effluent in the condition assessment model of the turbine blade. In another non-limiting example, at least a portion of a compressor may be washed, and by analysis of the effluent obtained by washing the compressor, a condition of a hot-section component of the engine may be assessed by inputting concentration values of one or more chemical species in the effluent in the condition assessment model of the hot-section component. A "hot-section component" as used herein is a component that is in the portion of a gas turbine that participates in fuel combustion and/or is exposed to the hot gaseous products of the combustion. Non-limiting examples of the hot-section component of the engine may include a turbine blade, a set of turbine blades, shrouds, blade underplatforms, or any combinations thereof.

In some embodiments, a plurality of first components of the engine may be washed and effluent(s) obtained from the wash of the plurality of first components may be analyzed for determining the concentration values of the chemical species present in the effluent. The analysis of the chemical species and determination of the concentration values may be conducted for individual effluents obtained from wash of individual first components of the plurality of first components. In some embodiments, the analysis of the chemical species and determination of the concentration values of the chemical species may be conducted collectively for a group of effluents, for example, a mixture of effluents corresponding to different first components of the plurality of first components. In some embodiments, a condition of one or more second components of the engine may be determined by inputting the concentration values of the chemical species obtained by analyzing individual effluents or the group of effluents of the plurality of first components.

In some embodiments, the concentration values of the chemical species obtained in the effluent of a single first component may be inputted to the condition assessment model of one or more second components. In some other embodiments, the concentration values of the chemical species obtained from the effluents of the one or more first components may be inputted to the condition assessment model of a single second component, or a plurality of second components to determine the condition of the second component(s).

The condition assessment model used for determining a condition of an engine component may be customized for that particular engine component or may be common for two or more engine components. For example, in some embodiments, one condition assessment model may be used for the determination of a condition of some components of the engine, such as, but not limited to, the turbine blades and shrouds. In some other embodiments, the condition assessment model may be fine-tuned individually for one or more engine components.

The method 10 may further include repeating the steps of determining the concentration values of the chemical species in an effluent of a first component of the engine, inputting the condition assessment, and estimating a condition of the second component of the engine at determined wash intervals. The wash intervals may be determined based on available prediction data or may be determined based on assessment by the updated condition assessment model. For example, in some embodiments, an estimation of a time dependent damage that is likely to occur in the second component of the engine may aid in determining a desirable time intervals between subsequent washes.

The condition assessment model may be updated repeatedly as more data regarding the chemical species of the effluent becomes available during the life of the engine component, thereby increasing a confidence factor corresponding to the condition assessment model. The condition assessment model or a plurality of condition assessment models may be used to further optimize service contract pricing, maintenance planning, or computing other financial or contractual risk. Additionally, the overall model may be used to construct a parts life dashboard in which the used or remaining life of a component, the estimated condition of the component at a given time, or a combination thereof may constantly computed and displayed to a user as the engine operating conditions change.

In certain embodiments, design models, remote monitoring and diagnostics (RMD) data, inspection data, and effluent data may be combined to form a single predictive model that allows for maximum utilization of available information regarding a particular component of the engine. Such single predictive model may also be used for components' lifespan forecasting with high statistical and physical confidence factors.

In some embodiments, in addition to updating the condition assessment model, the concentration values of the chemical species obtained from the effluent may further be used to update an engine efficiency model, where the engine efficiency model is representative of an efficiency of the engine. A non-limiting example of an engine efficiency model includes exhaust gas temperature (EGT) model.

In some embodiments, the method 10 for determining a condition of a second component of an engine includes determining concentration values of more than one chemical species in the effluent. In some embodiments, the condition assessment model may be configured to receive a ratio of the concentration values of the at least two chemical species in the effluent.

In some embodiments, a control system may be used to receive the concentration values of the chemical species, input the values to the condition assessment model and to produce an output of the updated condition assessment model. Further, the condition assessment model may take the form of a computer program product on a computer-usable storage medium having computer-usable program code embodied in the medium. Any suitable computer readable medium may be utilized. The computer-readable medium may be an electronic, magnetic, optical, electromagnetic, infrared, or semiconductor system, apparatus, device, or propagation medium. Non-limiting examples of the computer-readable medium would include a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, a magnetic or optical storage device.

The method 10 for determining a condition of the engine component may further be used to determine the wash interval, modify the determined wash interval, or a combination thereof, based on the concentration value of the chemical species. For example, but not limiting of, if the condition assessment model indicates an early accumulation of high levels of contaminants, then an embodiment of the present disclosure may seek to increase the wash frequency and/or duration to provide improved cleaning of the components of the engine. However, if the model indicates increased duration to accumulate a particular level of contaminants, then an embodiment of the present disclosure may seek to reduce the washing frequency and/or duration.

The water wash analysis data may also help improve the cleaning effectiveness of online and offline washing processes. Knowledge of the presence and concentration values of the chemical species in the effluent may enable development of specific cleaning chemicals or detergents and an effective cleaning process for cleaning the engine components. Specific cleaning chemicals may be determined based on the chemical species that separate out from the engines, and that persist during a routine wash process. For example, if oxides, chlorides, sulfate-based, and carbon-based chemical species were determined in the effluent, based on the concentration value of these chemical species, a wash fluid may be developed such that the developed wash fluid facilitates removing oxide-based, chloride-based, sulfate-based, and carbon-based constituents from the engine components. Further, the characterization techniques adopted herein may help in assessing the effectiveness of the on-wing and off-wing engine cleaning techniques.

EXAMPLES

The following examples illustrate methods, materials, and results, in accordance with specific embodiments, and as such should not be construed as imposing limitations upon the claims. All components are commercially available from common chemical suppliers.

Laboratory scale analyses of the effluents obtained by water-wash process of similar components of aviation engines (A1 and A2) of same type operated at different regions were conducted. A1 is an aviation engine that was used in flying passenger aircrafts in low-SEO (comparatively lower severe environment operation) locations and A2 is a similar type of aviation engine that was used in flying passenger aircrafts in high-SEO (comparatively higher severe environment operation) locations.

A consistent process of tapping water-wash effluent was established based on a preliminary study that showed insignificant difference in effluent composition between samples collected at timed intervals during a single rinse. The implemented process comprised of collecting a standard 200-250 ml effluent volume towards the end of every rinse of a water-wash cycle. The effluent thus obtained was filtered and weighed amount of the filtered effluent was acidified with nitric acid and diluted to desired levels for estimation of cations by inductively coupled plasma-optical emission spectroscopy (ICP-OES). The cations that were estimated included, but not limited to, sodium, potassium, calcium, silicon, and magnesium. Filtered effluents were diluted & used for analysis of anions such as sulfate, chloride, and nitrate by ion chromatography (IC).

The high-SEO locations used herein included Middle-East locations where an amount of contaminating species in the operating environment is comparatively more compared to the less-SEO locations. TDS (total dissolved solids) and TSS (total suspended solids) in the effluents of the water-wash process were conducted and checked for the repeatability of the results. It was clearly observed that the high-SEO operated engine showed higher concentration values of chemical species in the effluent as compared to the low-SEO operated engine. FIG. 1 shows a graphical illustration of representative sulfates: chlorides ion ratio of the A1 and A2 engines. This graph clearly demonstrates regional differences in specific contaminants that are known for material degradation in engine hardware. Further, while both sulfate ions and chloride ions were present in both the A1 and A2 engines, the concentration values of the sulfate ion in relation to the chloride ion is much different between the A1 and A2 engines. This information about the concentration values of sulfate ions and chloride ions in the components of engines operated in two different environments enables the prediction of a damage condition of those components and other components of the same engine, which was difficult to deduce by merely finding out the presence of the sulfate and chloride ions in the effluent.

Figure 2:
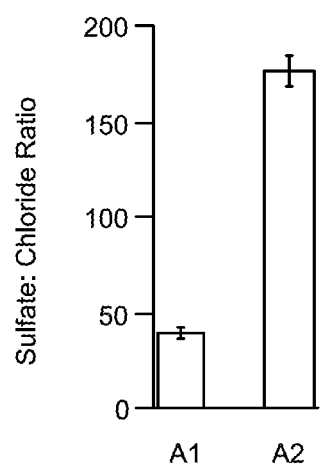
FIG. 2 is an illustrative comparison of representative sulfate to chloride ion ratios obtained from analyses of water-wash effluents of a component of multiple engines operated at two different types of environments, in accordance with an embodiment of the disclosure.

In a continued experiment, total dissolved solids of the A1 and A2 engines were measured in the 5th minute of four consecutive rinses of a wash cycle and used in an exhaust gas temperature recovery (EGTR) model to find the recovered exhaust gas temperature as a result of cleaning the component by water-wash. FIG. 2 provides graphical representations of the amount of TDS of A1 and A2 engines respectively obtained by the four consecutive rinses. The EGTR of the A1 engines were calculated to be very low compared to that of A2 engines. One possibility for observing this difference in the amounts of EGTR of A1 and A2 engines may be that the level of contaminants that accumulated in the A1 before washing was much lower than the level of contaminants accumulated in A2. Another possibility is that the washing conducted on the A2 engine may be more effective than the washing conducted on the A1 engine. For example, additional wash rinses or a changed wash practice (such as addition of detergent in water for cleaning) may be required to achieve a higher EGTR. Similar experiments carried out using different washing fluids may aid in establishing a set of suitable wash fluids for different engines operating in some environments.

In another example, a field-returned shroud hardware of an aviation engine was analyzed for understanding the shroud corrosion. A part of the shroud was chemically analyzed to understand the corrosion that had occurred on the surfaces and was found that the top layer of the corroded shroud included sulfates, mica/clay, silicates, quartz, CMAS products, and feldspar and the layer beneath the top layer included sodium, silicon, and calcium. A water-wash was of the compressor of the same engine was conducted and the effluents were analyzed using XRD (X-Ray Diffraction), SEM (Scanning Electron Microscopy), IC (Ion Chromatography), and ICP-OES (Inductively Coupled Plasma-Optical Emission Spectroscopy) for both dissolved solids and suspended solids. It was found that the sulfates, chlorides, and nitrates of calcium, potassium, and sodium were found dissolved in the water and silicates, silica, iron and aluminum oxides, and iron and aluminum sulfates were found suspended in the water.

Figure 3:
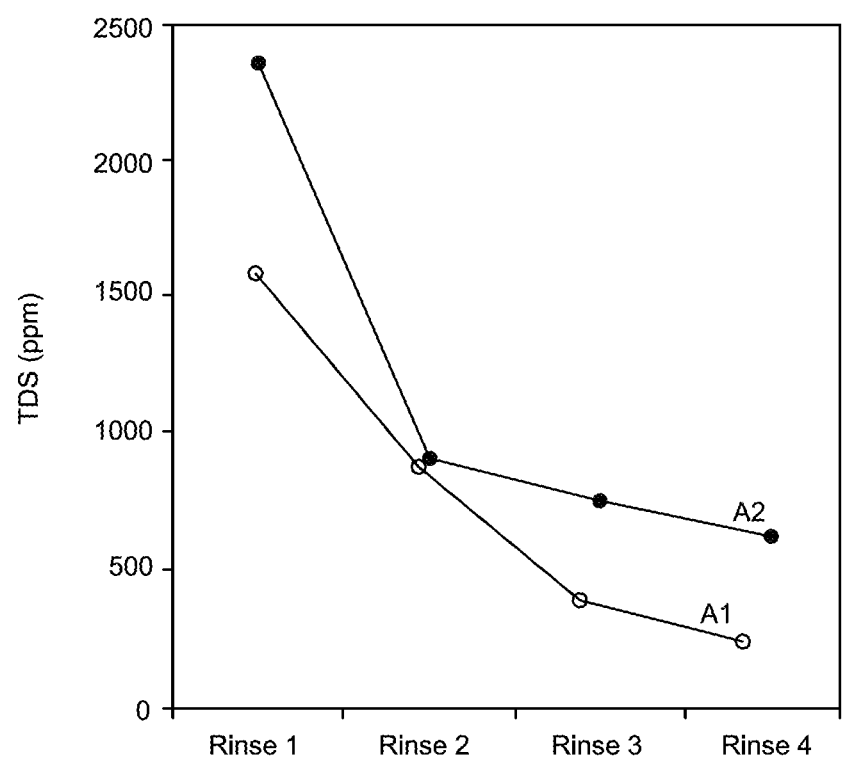
FIG. 3 is an illustrative comparison of representative total dissolved salts in water-wash effluents of a component of multiple engines operated at two different types of environments, in accordance with an embodiment of the disclosure.
Figure 4:
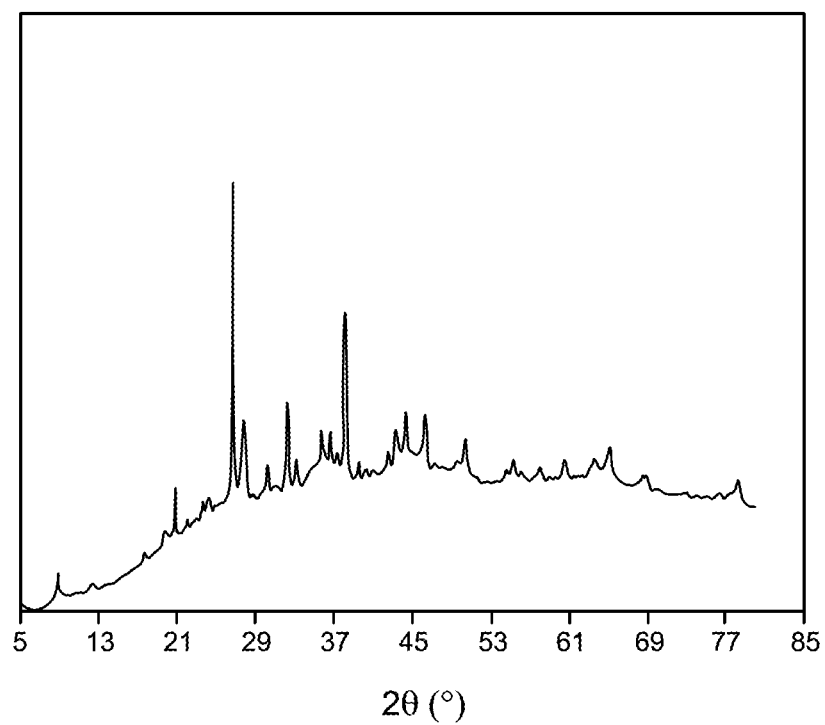
FIG. 4 illustrates a representative X-Ray diffraction data of suspended solids in a water-wash effluent of a compressor of an aviation engine, in accordance with an embodiment of the disclosure.

FIG. 3 shows an XRD pattern of the suspended solids of the water-wash effluents, illustrating the presence of silica, iron oxides, and silicates of sodium, aluminum, magnesium, nickel and iron. FIG. 4 illustrates the concentration values of different ionic species of the suspended solids as obtained from the ICP. As can be seen, cations such as silicon 22, iron 24, aluminum 26, nickel 28, potassium 30, cobalt 32, calcium 34, zinc 36, sodium 38, titanium 40, chromium 42, magnesium 44, copper 46, and sulfur 48 were observed to be present in the effluent obtained by washing the compressor. It was seen that the composition of the effluent deduced from water-wash effluent analysis is similar to that obtained from the direct chemical analysis of the shroud. Further, the concentration value of the chemical species obtained from the analysis of the water-wash effluents of the compressor may be effectively used in predicting the corrosion and other damage that are present in the other components that are part of the same engine. In some embodiments, the concentration value of the chemical species obtained from the analysis of the water-wash effluents of the compressor were used to estimate the corrosion of the nearby components such as, but not limited to, blades, blade underplatforms, blade tips, or combinations thereof.

In a further analysis, the concentration values of the chemical species obtained from the effluents of the water-wash process of the compressor were used to update a hot corrosion model of the engine and estimate a measure of damage that has occurred to the shroud because of hot corrosion. FIG. 5 illustrates a graphical comparison between the measure of damage obtained from the hot corrosion model of the shroud before and after updating with the concentration value of chemical species. The curve 52 represents the hot corrosion damage predicted by the hot-corrosion model and curve 54 illustrates a schematic, expected hot corrosion damage that may be predicted by updating the hot-corrosion model by inputting the concentration value of chemical species into the model. It can be seen that the damage predicted by the updated model shows an increased damage at a similar flight count as compared to that predicted by the earlier hot corrosion model that did not consider the input from the chemical analysis of the effluent. It was experimentally found that the curve 54 closely mimicked the actual damage observed in the shroud than the curve 52. Therefore, it can be concluded that inputting the concentration values of certain chemicals obtained from a fluid wash increases the accuracy of a condition assessment model.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What we claim is:

1. A method for determining a condition of a second component of an engine, wherein the engine comprises at least a first component and the second component, wherein the first component and the second components are components of an aviation engine, the method comprising:
    determining a concentration value of a chemical species in an effluent obtained from washing at least a portion of the first component of the engine, wherein the effluent comprises a wash fluid and the chemical species, and wherein the concentration value is indicative of environmental conditions the aviation engine has encountered;
    inputting the concentration value of the chemical species in a condition assessment model, to update the condition assessment model, wherein the condition assessment model is representative of a condition of the second component of the engine and wherein the second component is different from the first component; and
    estimating the condition of the second component based on an output of the updated condition assessment model.

2. The method of claim 1, further comprising washing at least the portion of the first component of the engine using the wash fluid to form the effluent.

3. The method of claim 1, wherein the wash fluid comprises water.

4. The method of claim 1, comprising determining concentration value of the chemical species dissolved in the wash fluid.

5. The method of claim 1, comprising determining concentration value of the chemical species suspended in the wash fluid.

6. The method of claim 1, wherein the chemical species comprises an organic species, an inorganic species, an ionic species, or combinations thereof.

7. The method of claim 1, wherein the chemical species comprises sulfur, chlorine, calcium, sodium, potassium, aluminum, magnesium, cobalt, nickel, iron, phosphorous, chromium, manganese, or combinations thereof.

8. The method of claim 1, wherein determining the concentration value of the chemical species comprises using X-ray diffraction, scanning electron microscopy, energy dispersive and wavelength dispersive spectroscopy, inductively coupled plasma mass spectroscopy, atomic emission spectroscopy, mass spectrometry, ion chromatography, or combinations thereof.

9. The method of claim 1, comprising determining concentration values of at least two chemical species in the effluent.

10. The method of claim 9, comprising inputting the condition assessment model with a ratio of the concentration values of the at least two chemical species in the effluent.

11. The method of claim 1, wherein the condition assessment model comprises a crack propagation model, an oxidation model, a corrosion model, a wear model, or combinations thereof.

12. The method of claim 1, wherein the first component and the second component are components of an aviation engine.

13. The method of claim 1, wherein the first component and the second component comprise an engine compressor, a compressor blade, a compressor casing, a combustor, a turbine blade, a turbine shroud, a turbine blade underplatform, a turbine disk, a turbine casing, or combinations thereof.

14. The method of claim 1, further comprising inputting the concentration value of the chemical species into an engine efficiency model, wherein the engine efficiency model is representative of an efficiency of the engine.

15. The method of claim 1, further comprising modifying the wash fluid based on the concentration value of the chemical species, updated condition assessment model, or a combination thereof.

16. The method of claim 1, further comprising repeating the steps of determining the concentration value of the chemical species in an effluent, inputting the concentration value of the chemical species in a condition assessment model, and estimating the condition of the second component of the engine, at specific wash intervals.

17. The method of claim 16, further comprising modifying the specific wash intervals based on the concentration value the chemical species, updated condition assessment model, or a combination thereof.

18. A method for determining corrosion of a hot-section component of an aviation engine, comprising:
    determining a concentration value of a chemical species in an effluent obtained from washing at least a portion of a compressor of the aviation engine, wherein the effluent comprises a wash fluid and the chemical species;
    inputting the concentration value of the chemical species in a corrosion model of the hot-section component of the aviation engine to update the corrosion model, wherein the corrosion model is representative of a corrosion in the hot-section component of the aviation engine; and
    estimating presence of the corrosion, an amount of the corrosion, or both of the hot-section component of the aviation engine.

19. The method of claim 18, further comprising washing at least the portion of the compressor using the wash fluid comprising water to form the effluent.

* * * * *